United States Patent
Ida

(10) Patent No.: US 12,020,108 B2
(45) Date of Patent: Jun. 25, 2024

(54) CARD READING APPARATUS

(71) Applicant: TOSHIBA TEC KABUSHIKI KAISHA, Tokyo (JP)

(72) Inventor: Taku Ida, Chiba Chiba (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 412 days.

(21) Appl. No.: 17/336,225

(22) Filed: Jun. 1, 2021

(65) Prior Publication Data

US 2022/0067310 A1 Mar. 3, 2022

(30) Foreign Application Priority Data

Sep. 3, 2020 (JP) ................................. 2020-148043

(51) Int. Cl.
G06K 7/00 (2006.01)
(52) U.S. Cl.
CPC ........... G06K 7/0082 (2013.01); G06K 7/006 (2013.01); G06K 7/0065 (2013.01)
(58) Field of Classification Search
CPC ..... G06K 7/0082; G06K 7/006; G06K 7/0065
USPC ........................................................ 235/441
See application file for complete search history.

(56) References Cited

U.S. PATENT DOCUMENTS

| | | | | |
|---|---|---|---|---|
| 6,788,549 B2 * | 9/2004 | Hsiao | ................... | H05K 5/0286 |
| | | | | 361/799 |
| 8,969,464 B2 | 3/2015 | LeBlanc | | |
| 10,075,579 B2 | 9/2018 | Won et al. | | |
| 2010/0108768 A1 * | 5/2010 | Ishikawa | ............ | G06K 7/10782 |
| | | | | 235/470 |
| 2011/0284636 A1 * | 11/2011 | Kasai | ....................... | G11B 5/40 |
| | | | | 235/449 |
| 2017/0351880 A1 * | 12/2017 | Ozawa | ................. | G06K 7/0004 |

FOREIGN PATENT DOCUMENTS

| | | |
|---|---|---|
| JP | S62-275738 A | 11/1987 |
| JP | 2015-069482 A | 4/2015 |

OTHER PUBLICATIONS

Notice of Reasons for Refusal mailed Feb. 20, 2024 in corresponding Japanese Patent Application No. 2020-148043, 7 pages (with Translation).

* cited by examiner

*Primary Examiner* — Daniel A Hess
(74) *Attorney, Agent, or Firm* — Kim & Stewart LLP

(57) ABSTRACT

A card reading apparatus includes an insertion slot into which a card is inserted, a card reader configured to read information from the card inserted into the insertion slot, and a guide portion extending from the insertion slot and formed of a conductive material that removes static electricity.

13 Claims, 4 Drawing Sheets

CARD READING APPARATUS

CROSS-REFERENCE TO RELATED APPLICATIONS

This application is based upon and claims the benefit of priority from Japanese Patent Application No. 2020-148043 filed on Sep. 3, 2020, the entire contents of which are incorporated herein by reference.

FIELD

Embodiments described herein relate generally to a card reading apparatus.

BACKGROUND

In the related art, an information processing apparatus that executes a settlement process for paying a price of a purchased product by a credit card is known. In the settlement process, such an apparatus reads information from the credit card inserted into the apparatus.

However, if the inserted card is electrostatically charged, the apparatus may fail due discharge of static electricity.

DETAILED DESCRIPTION

In general, according to one embodiment, a card reading apparatus includes an insertion slot into which a card is inserted, a card reader configured to read information from the card inserted into the insertion slot, and a guide portion extending from the insertion slot and formed of a conductive material that removes static electricity.

Hereinafter, one or more embodiments of a card reading apparatus will be described with reference to the accompanying drawings. The example embodiments described below relate to a card reading apparatus but are not limited thereto.

First Embodiment

Figure 1:
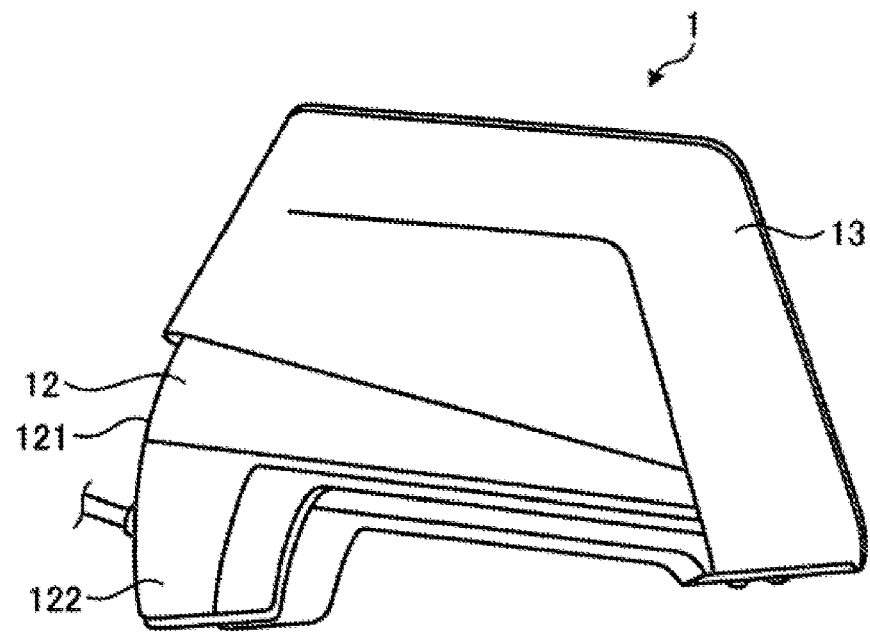
FIG. 1 is a side view of a card reading apparatus according to a first embodiment.

FIG. 1 is a side view of a card reading apparatus 1 according to a first embodiment. The card reading apparatus 1 is placed on a counter table or the like. Then, the card reading apparatus 1 reads information from an inserted card such as a credit card to execute settlement processing. The card reading apparatus 1 includes a main body unit 12 and a barrier unit 13 for blocking the sight line of a third person.

Figure 4:
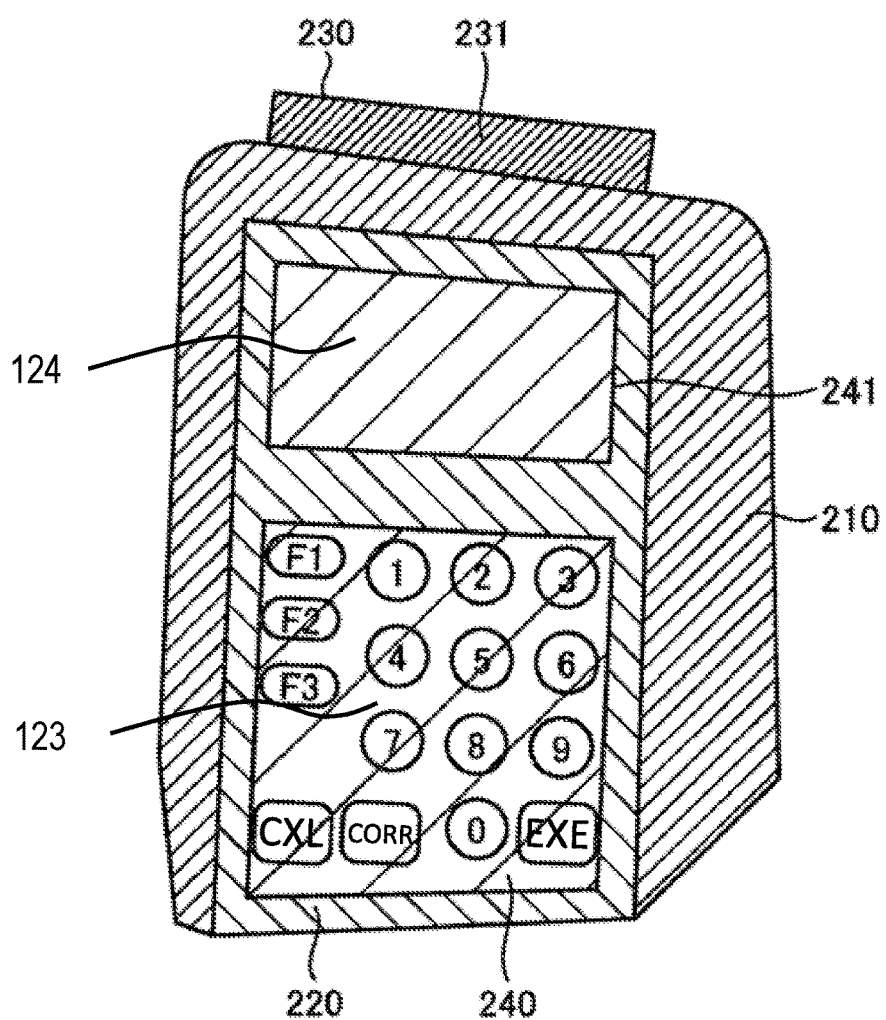
FIG. 4 is a top view of a card reading apparatus covered with an apparatus cover according to a first embodiment.

The main body unit 12 includes an insertion slot 121, pedestal unit 122, an operation unit 123 (see FIG. 4), and a display unit 124 (see FIG. 4). The insertion slot 121 accepts a card such as a credit card. The operation unit 123 is one or more buttons such as numeric keys for receiving an input of a personal identification number or the like matching the card inserted into the insertion slot 121. The display unit 124 is a liquid crystal display (LCD) that displays a payment amount and the like.

When a personal identification number or the like matching the card that has been inserted into the insertion slot 121 is input from the operation unit 123, a processing circuit or a controller disposed in the main body unit 12 executes settlement processing using the card. The pedestal unit 122 is a pedestal for inclining (angling) the main body unit 12. Since the pedestal unit 122 is inclined, the visibility of the display unit 124 is improved and the operability of the operation unit 123 is improved.

The barrier unit 13 is a wall that surrounds the display unit 124 and the operation unit 123 in three directions. Since the barrier unit 13 surrounds the periphery of the display unit 124 and the operation unit 123 in three directions, it is possible to block a third person from looking into the display unit 124 and the operation unit 123.

In such a card reading apparatus 1, when the card inserted into the insertion slot 121 is electrically charged, various circuits and various elements stored inside the main body unit 12 may fail due to static electricity discharged from the card. Therefore, there is a need for a technique to discharge the card prior to its insertion into the insertion slot 121.

The card reading apparatus 1 is placed on a counter table or the like in a restaurant or a retail store. Thus, there is a possibility that the card reading apparatus 1 falls from the counter table and fails.

In addition, the card reading apparatus 1 may fail when a beverage, such as beer, is poured on the counter stand. Therefore, the card reading apparatus 1 includes an apparatus cover 20. The apparatus cover 20 covers the card reading apparatus 1. For example, the apparatus cover 20 is a silicone rubber cover on which an antibacterial agent is applied. Thus, the apparatus cover 20 can suppress the growth of bacteria.

Figure 2:
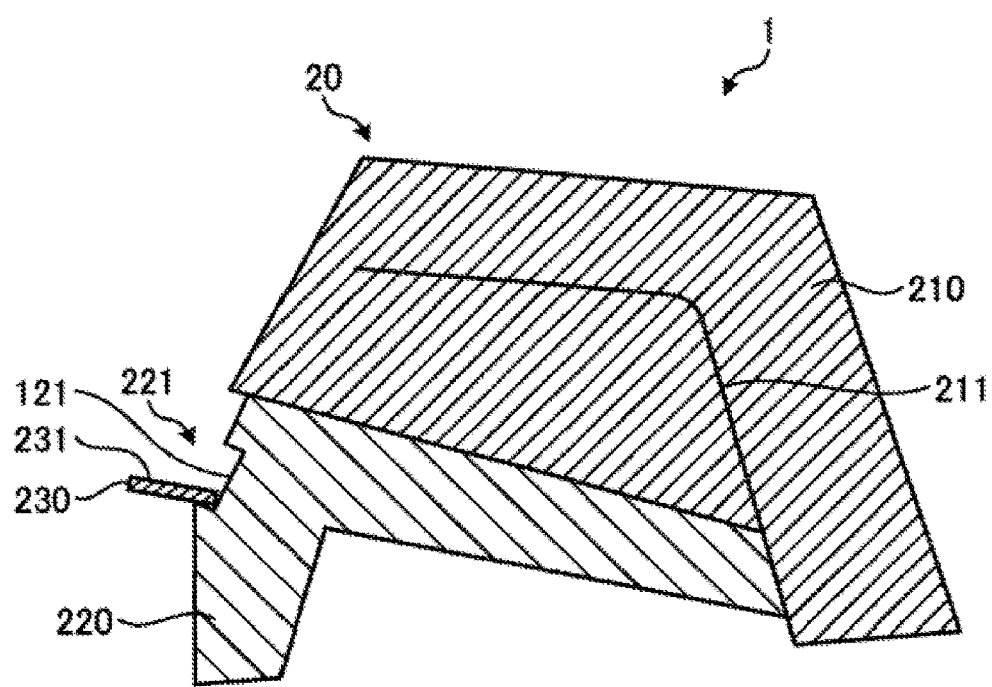
FIG. 2 is a side view of a card reading apparatus covered with an apparatus cover according to a first embodiment.
Figure 3:
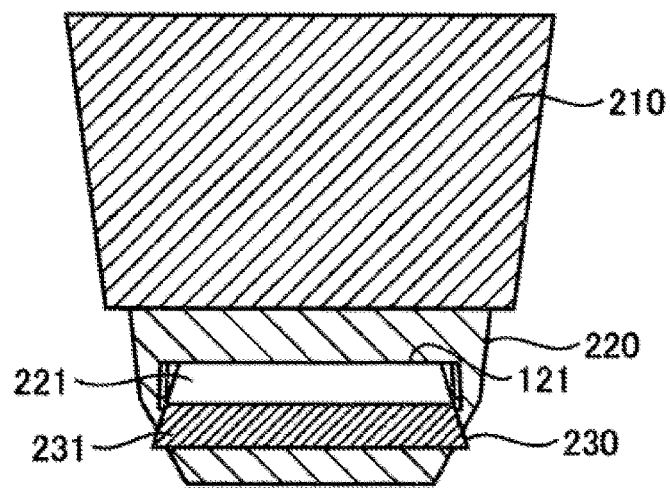
FIG. 3 is a front view of a card reading apparatus covered with an apparatus cover according to a first embodiment.
Figure 5:
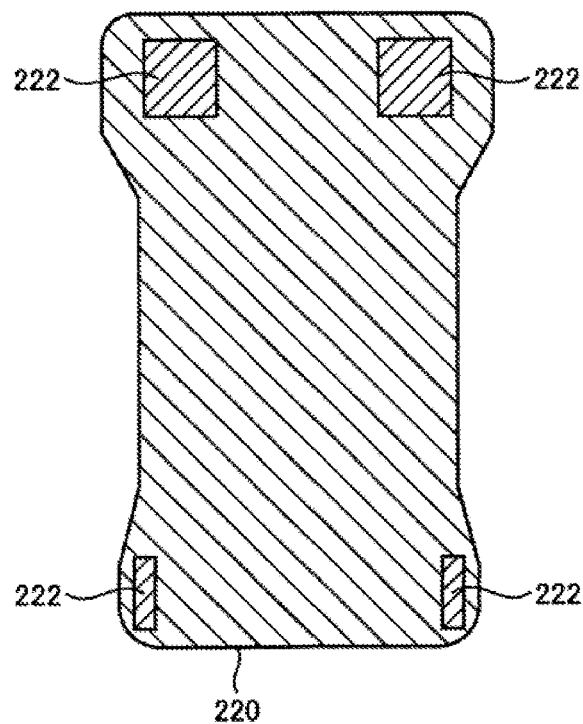
FIG. 5 is a bottom view of a card reading apparatus covered with an apparatus cover according to a first embodiment.

FIG. 2 is a side view of the card reading apparatus 1 covered with the apparatus cover 20. FIG. 3 is a front view of the card reading apparatus 1 covered with the apparatus cover 20 as viewed from the insertion slot 121. FIG. 4 is a top view of the card reading apparatus 1 covered with the apparatus cover 20. FIG. 5 is a bottom view of the card reading apparatus 1 covered with the apparatus cover 20.

The apparatus cover 20 includes an alternative barrier portion 210, a main body unit cover 220, and a card guide portion 230.

The alternative barrier portion 210 is a wall that blocks the line of sight of a third person instead of the barrier unit 13 of the card reading apparatus 1. That is, the alternative barrier portion 210 surrounds three directions among the peripheries of the display unit 124 and the operation unit 123 of the card reading apparatus 1 when the apparatus cover 20 is mounted on the card reading apparatus 1. Similar to the barrier unit 13, the alternative barrier portion 210 surrounds the display unit 124 and the operation unit 123 of the card reading apparatus 1 in three directions, and thus can prevent a third person from looking into the card reading apparatus 1.

The alternative barrier portion 210 includes a hook portion 211 for the user to hold the card reading apparatus 1 when the card reading apparatus 1 is moved and held. The hook portion 211 is formed in the shape of a concave portion or a convex portion. The hook portion 211 is provided substantially at the center of the alternative barrier portion 210 and substantially parallel to the outer edge of the alternative barrier portion 210. Therefore, when the card reading apparatus 1 is held, the hook portion 211 can prevent the card reading apparatus 1 from slipping off from the hand of the user.

Further, the alternative barrier portion 210 and the side surfaces of the main body unit cover 220 may be made of a material providing a large frictional force such as silicone rubber. Also in this case, the alternative barrier portion 210 and the side surfaces of the main body unit cover 220 can help prevent the card reading apparatus 1 from slipping from the hand of the user when the card reading apparatus 1 is being held.

The main body unit cover 220 covers the main body unit 12. The main body unit cover 220 includes a first transparent portion 240 located at a position facing the operation unit 123 of the main body unit 12. The first transparent portion 240 is formed of a transparent material capable of transmitting visible light. Therefore, the operator can visually recognize the numerals and characters displayed on the buttons of the operation unit 123.

The main body unit cover 220 includes a second transmission portion 241 at a position facing the display unit 124 of the main body unit 12. The second transmission portion 241 is formed of a material capable of transmitting visible light. Therefore, the operator can visually recognize the image displayed on the display unit 124.

In addition, as shown in FIG. 5, the main body unit cover 220 includes a plurality of elastic portions 222 on the bottom surface of the main body unit 12. The elastic portions 222 are formed of a material having elastic force. The elastic portions 222 absorb an impact when the card reading apparatus 1 is placed on a counter stand or dropped on a floor or the like. The elastic portions 222 shown in FIG. 5 are provided at four corners of the bottom surface of the main body unit 12, but may be provided at other positions. In addition, the elastic portions 222 may have an elastic force by increasing its thickness compared to other portions.

Furthermore, by covering the operation unit 123 and the display unit 124 of the main body unit 12, the main body unit cover 220 can prevent a spilled beverage or the like from entering into the inside of the main body unit 12 through a gap between the operation unit 123 and the display unit 124. That is, the main body unit cover 220 can reduce the possibility that the card reading apparatus 1 fails when a beverage or the like is spilled on the card reading apparatus 1.

The main body unit cover 220 has an opening 221 at a position corresponding to the position of the insertion slot 121 of the main body unit 12 for receiving a card. The opening 221 is an opening through which the card passes when the card is inserted into the insertion slot 121.

The main body unit cover 220 includes a card guide portion 230 below the insertion slot 121. In other words, the card guide portion 230 is a part of the apparatus cover 20 covering the card reading apparatus 1. The card guide portion 230 has a static electricity removal member 231 for removing static electricity and guides the insertion of the card. More specifically, the card guide portion 230 is a plate-shaped member extending along a direction substantially parallel to the insertion direction of the card into the insertion slot 121.

The card guide portion 230 has a detachable static electricity removal member 231. For example, the static electricity removal member 231 can be attached to an upper surface of the card guide 230. The static electricity removal member 231 is formed of, for example, a conductive fiber or material. The frictional force resulting from the conductive fiber/material is smaller than that of silicone rubber forming the card guide portion 230. Therefore, it makes it possible for an inserted card to slide smoothly along the static electricity removal member 231.

When the card is inserted into the insertion slot 121, the card contacts the static electricity removal member 231 of the card guide portion 230, thereby static electricity can be removed/discharged. That is, static electricity is removed from the card before the card is fully inserted into the card reading apparatus 1. Therefore, when the card is being inserted into the card reading apparatus 1, the card guide portion 230 can prevent the card reading apparatus 1 from failing due to static electricity.

Figure 6:
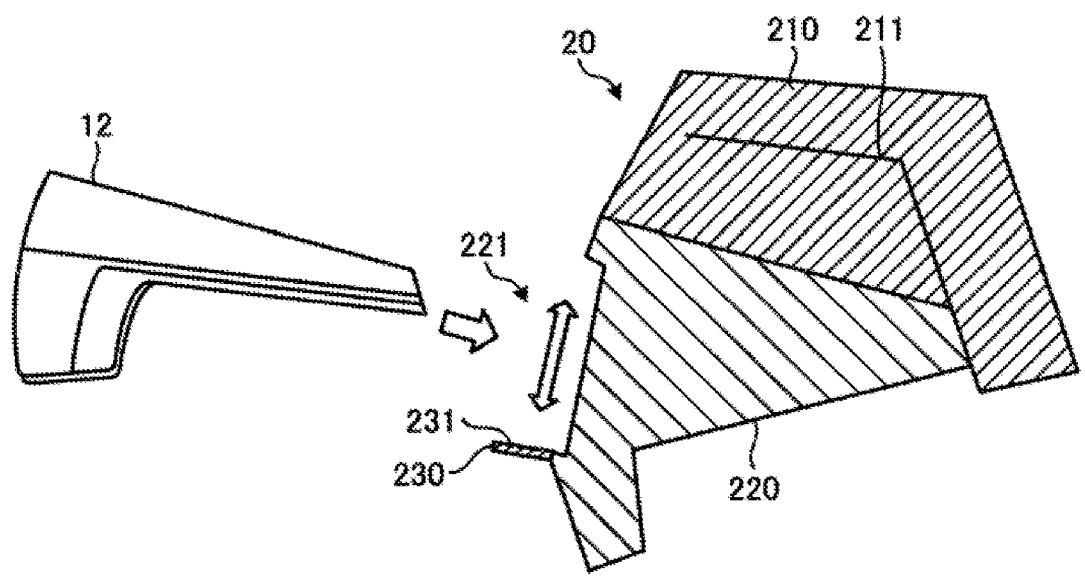
FIG. 6 is a diagram illustrating a mounting method of an apparatus cover on a card reading apparatus according to a first embodiment.

Next, a method of mounting the apparatus cover 20 on the card reading apparatus 1 will be described. FIG. 6 is a diagram illustrating the apparatus cover 20 mounted on the card reading apparatus 1. The main body unit cover 220 around the opening 221 is formed of, for example, soft, elastic silicone rubber. The operator can widen the opening 221 of the main body unit cover 220. The barrier unit 13 of the card reading apparatus 1 is detachable from the main body unit 12. When attaching the apparatus cover 20, the operator removes the barrier unit 13 from the main body unit 12.

As a result, since the card reading apparatus 1 does not have the barrier unit 13, the height of the card reading apparatus 1 itself is reduced. Then, the operator inserts the main body unit 12 into the widened opening 221 to attach the apparatus cover 20 to the card reading apparatus 1. In addition, although the barrier unit 13 is removed, the apparatus cover 20 can block the line of sight of a third person by the alternative barrier portion 210.

As described above, the card reading apparatus 1 includes the static electricity removal member 231 that removes static electricity, and the card guide portion 230 that guides the card inserted into the insertion slot 121. Therefore, when the operator inserts the card into the insertion slot 121, the static electricity removal member 231 comes into contact with the card. Thus, the static electricity removal member 231 removes static electricity from the card. Therefore, it is possible to reduce the possibility that the card processing by card reading apparatus 1 will fail.

Second Embodiment

A card reading apparatus 11 according to a second embodiment is a handheld apparatus. That is, the card reading apparatus 11 is different from the card reading apparatus 1 in that the pedestal unit 122 is not provided.

Figure 7:
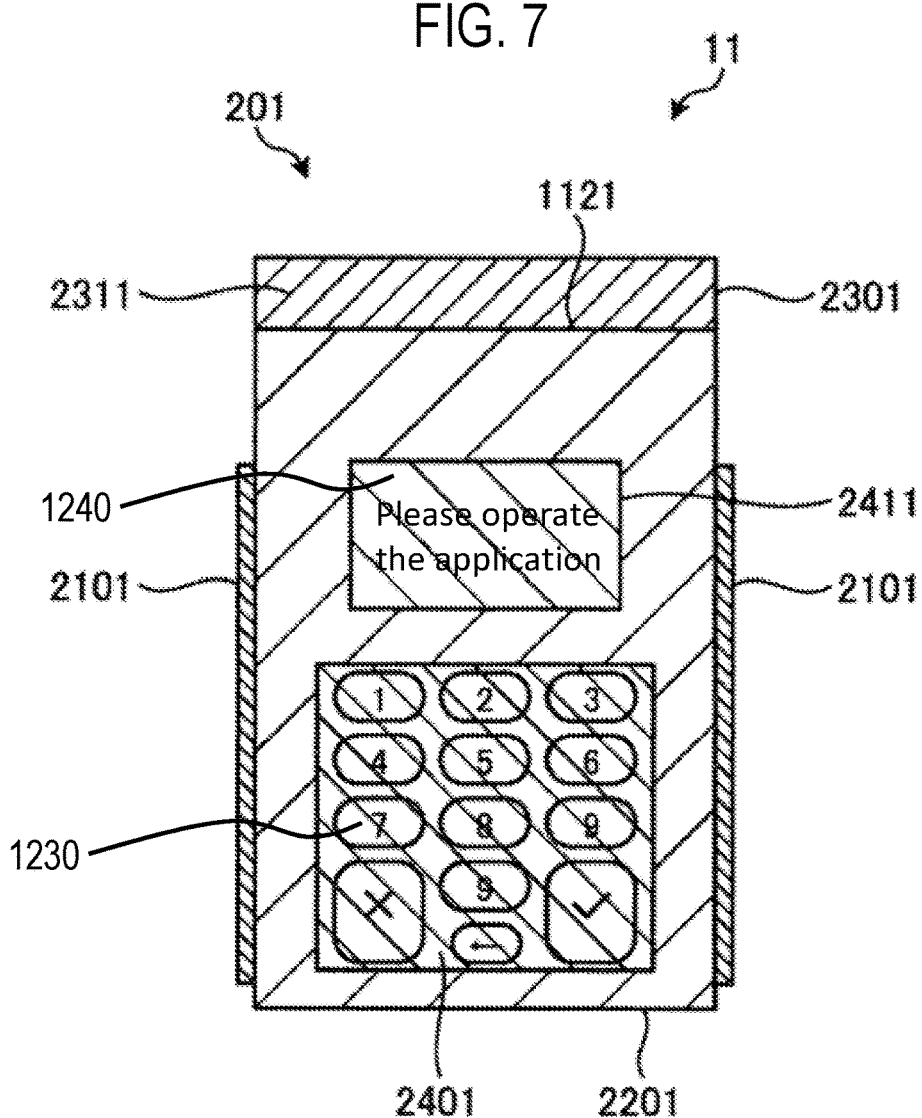
FIG. 7 is a top view illustrating a card reading apparatus covered with an apparatus cover according to a second embodiment.
Figure 8:
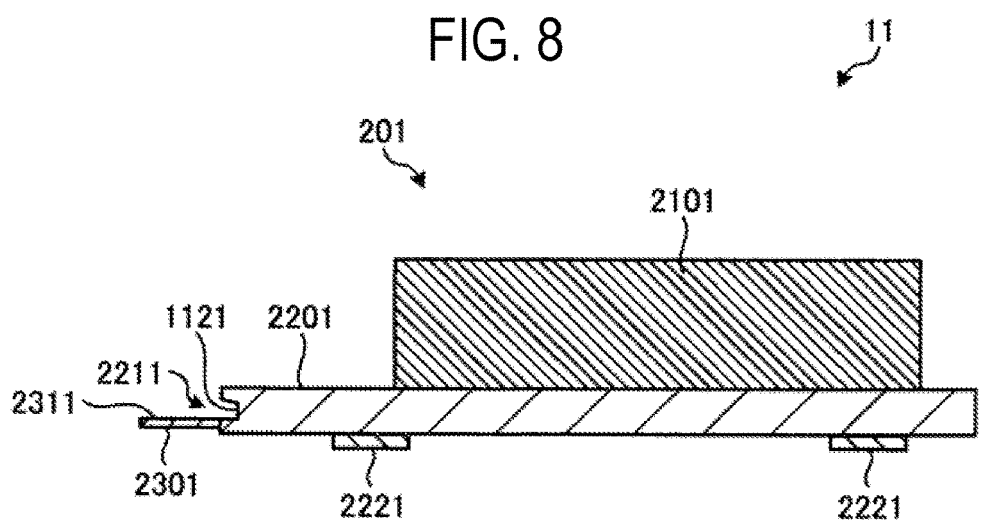
FIG. 8 is a side view of a card reading apparatus covered with an apparatus cover according to a second embodiment.

FIG. 7 is a top view of the card reading apparatus 11 covered with an apparatus cover 201. FIG. 8 is a side view of the card reading apparatus 11 covered with the apparatus cover 201.

Similar to the first embodiment, the card reading apparatus 11 includes an insertion slot 1121 through which a card is inserted. Similar to the first embodiment, the card reading apparatus 11 includes an alternative barrier portion 2101, a main body unit cover 2201, and a card guide portion 2301.

The main body unit cover 2201 includes a first transparent portion 2401 at a position facing an operation unit 1230 and a second transparent portion 2411 at a position facing a display unit 1240. The main body unit cover 2201 includes elastic portions 2221 at four corners of the bottom surface.

Similar to the first embodiment, the main body unit cover 2201 includes a card guide portion 2301 below the opening 2211. The card guide portion 2301 is provided below the insertion slot 1121 to guide an inserted card. The card guide portion 2301 has a static electricity removal member 2311 for removing static electricity and guides the card. The card guide portion 2301 is formed by a detachable static electricity removal member 2311. For example, the static electricity removal member 2311 may be attached to an upper surface of the card guide portion 2301.

The operator attaches the apparatus cover 201 to the card reading apparatus 11 by the same method as in the first embodiment. That is, the operator attaches the apparatus cover 201 to the card reading apparatus 11 by inserting the card reading apparatus 11 from the widen opening 2211. The detachable static electricity removal member 231 for removing static electricity may be further provided on the alternative barrier portion 210 of the main body unit cover 220 or the alternative barrier portion 2101 of the main body unit cover 2201. In such a case, when the operator operates the card reading apparatus 11, the static electricity of the card can be discharged by contacting the static electricity removal member 231.

As described above, in the card reading apparatus 11, the static electricity removal member 231 is attached to the card guide portion 2301. Therefore, it is possible to reduce the possibility that the card processing card reading apparatus 11 fails due to static electricity.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A card reading apparatus, comprising:
    a body including a side surface along which a card insertion slot is disposed and an upper surface along which one or more keys and a display are arranged;
    a removeable cover by which the body is covered and having an opening located corresponding to the card insertion slot, wherein
    the cover includes:
        a guide portion located at the opening, extending along a direction substantially parallel to a card insertion direction of the card insertion slot, and including a conductive fiber, and
        a transparent portion located corresponding to the keys and the display.

2. The card reading apparatus according to claim 1, wherein the guide portion is detachable.

3. The card reading apparatus according to claim 1, wherein the guide portion extends along an edge of the opening.

4. The card reading apparatus according to claim 1, wherein an edge of the opening is formed of an elastic material.

5. The card reading apparatus according to claim 1, wherein the cover includes a barrier portion that extends upwards so as to surround three sides of the upper surface.

6. The card reading apparatus according to claim 5, wherein the cover includes a hook portion that protrudes from the barrier portion or is a recess in the barrier portion.

7. The card reading apparatus according to claim 1, wherein the cover includes a plurality of elastic portions on a bottom surface thereof.

8. The card reading apparatus according to claim 1, further comprising:
    a pedestal unit attached to an end of a bottom surface of the body.

9. The card reading apparatus according to claim 1, further comprising:
    a detachable barrier portion that extends upwards from three sides of the upper surface.

10. The card reading apparatus according to claim 1, wherein
    the body includes a pedestal unit, and
    the upper surface of the body is inclined with respect to a bottom surface of the pedestal unit such that an upper edge of the side surface along which the card insertion slot is disposed is higher than an upper edge of another side surface of the body.

11. A card reading apparatus, comprising:
    a body including:
        a card insertion slot along a side surface of the body,
        one or more keys through which information related to a card inserted into the card insertion slot can be input, along an upper surface of the body, and
        a display along the upper surface of the body; and
    a removeable cover by which the body is covered and having an opening located corresponding to the card insertion slot, wherein
    the cover includes:
        a guide portion located at the opening, extending along a direction substantially parallel to a card insertion direction of the card insertion slot, and comprising a conductive fiber, and
        a transparent portion located corresponding to the keys and the display.

12. The card reading apparatus according to claim 11, wherein the guide portion is detachable.

13. The card reading apparatus according to claim 11, wherein
    the body includes a pedestal unit, and
    the upper surface of the body is inclined with respect to a bottom surface of the pedestal unit such that an upper edge of the side surface along which the card insertion slot is disposed is higher than an upper edge of another side surface of the body.

* * * * *